US008398285B2

United States Patent
Ye et al.

(10) Patent No.: US 8,398,285 B2
(45) Date of Patent: Mar. 19, 2013

(54) LIGHTING DEVICE

(75) Inventors: Zhi-Ting Ye, Zaociao Township, Miaoli County (TW); Ping-Yeng Chen, Taichung (TW); Kuo-Jui Huang, Taichung (TW)

(73) Assignees: Wintek Corporation, Taichung (TW); Wintek (China) Technology Ltd., Dongguan, Guangdong Province (CN)

( * ) Notice: Subject to any disclaimer, the term of this patent is extended or adjusted under 35 U.S.C. 154(b) by 0 days.

(21) Appl. No.: 13/233,764

(22) Filed: Sep. 15, 2011

(65) Prior Publication Data

US 2012/0063130 A1    Mar. 15, 2012

(30) Foreign Application Priority Data

Sep. 15, 2010  (TW) .............................. 99131309 A

(51) Int. Cl.
*G02B 6/00*  (2006.01)
(52) U.S. Cl. ....................................... 362/551; 362/555
(58) Field of Classification Search .................. 362/551, 362/555, 558, 559, 560, 235
See application file for complete search history.

(56) References Cited

FOREIGN PATENT DOCUMENTS

| CN | 201106807 Y | 8/2008 |
| CN | 101782218 A | 7/2010 |
| DE | 10032158 A1 | 1/2002 |
| DE | 10356483 A1 | 7/2005 |
| DE | 102007010023 A1 | 9/2007 |
| DE | 102006062272 A1 | 6/2008 |
| JP | 2005347214 A * | 12/2005 |
| TW | M352623 | 3/2009 |

OTHER PUBLICATIONS

English language translation of abstract of TW M352623 (published Mar. 11, 2009).
DE Office Action dated Nov. 5, 2011.
English Abstract translation of DE10356483 (Published Jul. 14, 2005).
English Abstract translation of DE102007010023 (Published Sep. 13, 2007).
English Abstract translation of DE10032158 (Published Jan. 10, 2002).
English Abstract translation of DE102006062272 (Published Jun. 26, 2008).
English translation of DE Office Action dated Nov. 5, 2012.
CN Office Action dated Jan. 24, 2013.
English abstract translation of CN201106807Y (published Aug. 27, 2008).
English abstract translation of CN101782218A (published Jul. 21, 2010).

* cited by examiner

*Primary Examiner* — David V Bruce
(74) *Attorney, Agent, or Firm* — McClure, Qualey & Rodack, LLP

(57) ABSTRACT

The present invention describes a lighting device. The lighting device includes a first light guiding pillar, at least one first point-form light source, a second light guiding pillar and at least one second point-form light source. The first point-form light source is disposed near at least one end of the first light guiding pillar. The first and the second light guiding pillars are parallel with each other and integrally formed in one piece. The second point-form light source is disposed near at least one end of the second light guiding pillar. The first and the second light guiding pillars are integrated into a connection body having two opposite surfaces respectively forming two straight grooves on an intersection of the first and the second light guiding pillars, wherein two bottoms of the straight grooves are spaced by a predetermined distance.

9 Claims, 4 Drawing Sheets

LIGHTING DEVICE

This application claims the benefit of Taiwan application Serial No. 099131309, filed Sep. 15, 2010, the subject matter of which is incorporated herein by reference.

BACKGROUND OF THE INVENTION

1. Field of the Invention

The invention relates in general to a lighting device, and more particularly to a lighting device with light guiding pillars.

2. Description of the Related Art

Flat display panels, having the advantages of lightweight, slimness and compactness, have replaced conventional CRT displays and become a mainstream product in the display market. Furthermore, most electronic devices are equipped with a flat display panel.

Based on the categories of light emitting sources, flat display panels can divided into active light emitting panels and passive light emitting panels. The passive light emitting panel receives the light emitted from a light source so as to form various frames. In order to reduce the thickness of the flat display panel, a small sized light source such as light emitting diode is provided.

The light emitted from a light source can be guided towards a particular direction by a light guide. However, to increase luminance uniformity, the light guide must convert the light emitted from a light source into a uniformed light. Thus, how to provide a structural design of the light guide which provides the flat display panel with higher luminance uniformity has become a prominent task for the industries.

SUMMARY OF THE INVENTION

The invention is directed to a lighting device in which two light guiding pillars are parallel with each other and integrally formed in one piece for reducing the volume and weight of the lighting device and increasing the luminance and uniformity of the emitted light.

According to an aspect of the present invention, a lighting device is provided. The lighting device includes at least one first light guiding pillar, a first point-form light source, a second light guiding pillar and at least one second point-form light source. The first point-form light source is disposed near at least one end of the first light guiding pillar. The first and the second light guiding pillars are parallel with each other and integrally formed in one piece. The second point-form light source is disposed near at least one end of the second light guiding pillar. The first and the second light guiding pillars are integrated into a connection body having two opposite surfaces respectively forming two straight grooves on an intersection of the first and the second light guiding pillars, wherein two bottoms of the straight grooves are spaced by a predetermined distance.

The above and other aspects of the invention will become better understood with regard to the following detailed description of the preferred but non-limiting embodiment(s). The following description is made with reference to the accompanying drawings.

DETAILED DESCRIPTION OF THE INVENTION

A number of embodiments are disclosed below for elaborating the invention. However, the embodiments of the invention are for detailed exemplary descriptions only, not for limiting the scope of protection of the invention. Moreover, secondary elements are omitted in the accompanying drawings of the embodiments to highlight the technical features of the disclosure.

First Embodiment

Figure 1:
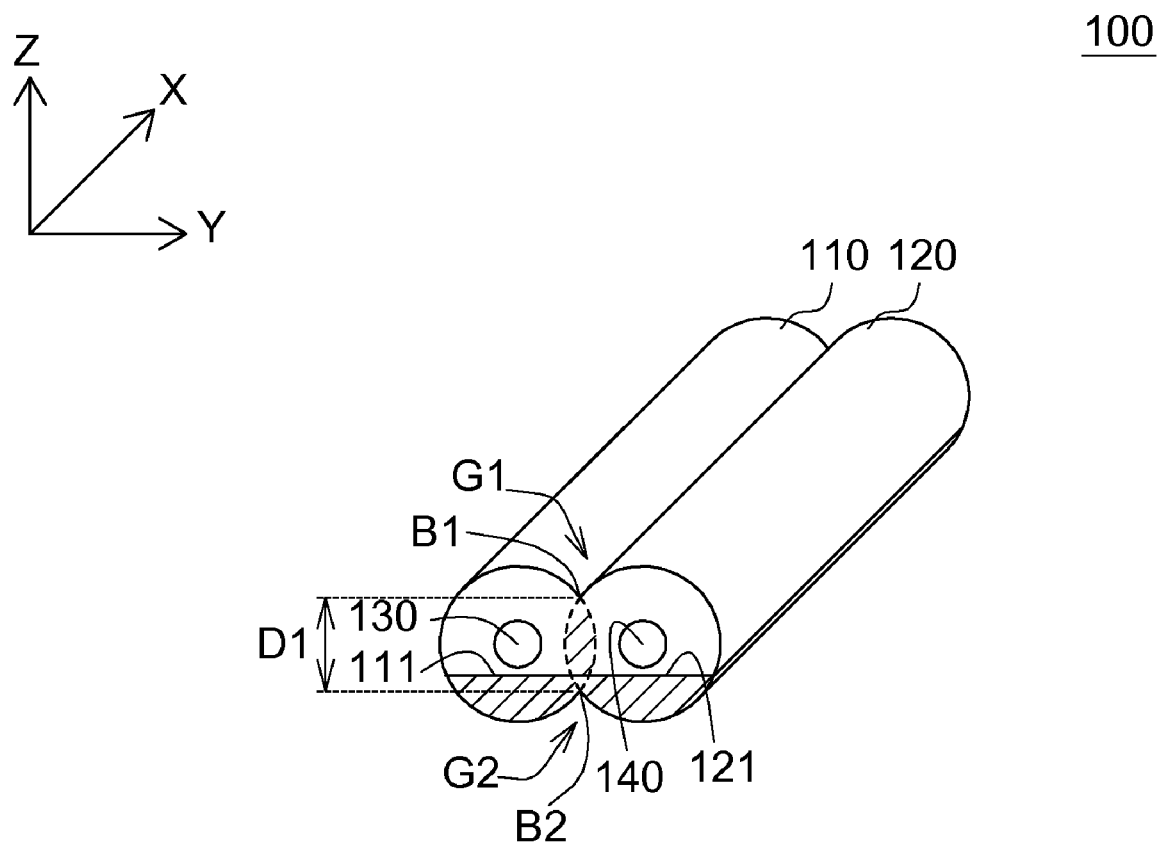
FIG. 1 shows a 3-D diagram of a lighting device according to a first embodiment.

Referring to FIG. 1, a 3-D diagram of a lighting device 100 according to a first embodiment is shown. The lighting device 100 includes a first light guiding pillar 110, a first point-form light source 130, a second light guiding pillar 120, and a second point-form light source 140. The first and the second light guiding pillars 110 and 120 are parallel with each other (such as disposed in parallel towards the X-axis direction) and integrally formed in one piece. The first and the second light guiding pillars 110 and 120 are integrated into a connection body having two opposite surfaces respectively forming straight grooves G1 and G2 on an intersection of the first light guiding pillar 110 and the second light guiding pillar 120. Two groove bottoms B1 and B2 of two straight grooves G1 and G2 are spaced by a predetermined distance D1. That is, the two straight grooves G1 and G2 are not on the same groove bottom. In other words, under the circumstance that the two straight grooves G1 and G2 of the first and the second light guiding pillars 110 and 120 are not on the same groove bottom, the first and the second light guiding pillars 110 and 120 are partly intersected. In comparison to the conventional design in which two light guiding pillars are separated, the lighting device 100 of the present embodiment of the invention has the advantages of reducing the volume and the weight.

The first and the second point-form light sources 130 and 140 can both be realized by such as a light emitting diode (LED). The first and the second point-form light sources 130 and 140 respectively are disposed near at least one end of the first and the second light guiding pillars 110 and 120.

In the present embodiment of the invention, the first light guiding pillar 110 includes a first reflective layer 111, and the second light guiding pillar 120 includes a second reflective layer 121. After the lights emitted by the first and the second point-form light sources 130 and 140 enter the first and the second light guiding pillars 110 and 120, the lights are guided to the central parts of the first and the second light guiding pillars 110 and 120, and then the lights, being reflected by the first and the second reflective layers 111 and 121, are emitted towards the outside of the lighting device 100. The first and the second reflective layers 111 and 121 can be diffusively reflected or diffused so as to break the full reflection path of the light. Thus, the lights emitted by the first and the second point-form light sources 130 and 140, which are originally more concentrated, become more uniformly emitted after having been guided by the first and the second light guiding pillars 110 and 120.

Figure 2B:
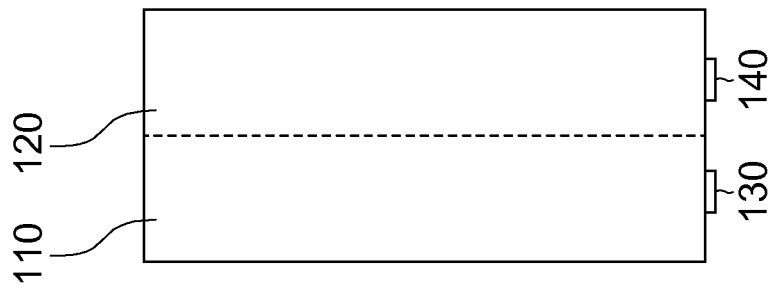
FIG. 2B shows a top view of the lighting device according to another embodiment.
Figure 2A:
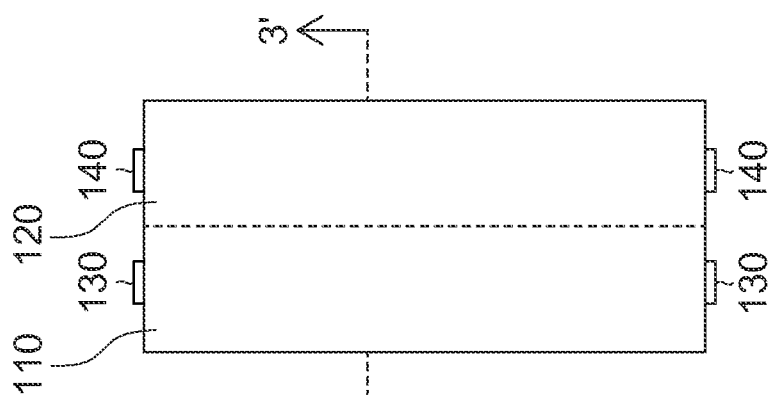
FIG. 2A shows a top view of the lighting device of FIG. 1.

Referring to FIG. 2A, a top view of the lighting device 100 of FIG. 1 is shown. In the present embodiment of the invention, the lighting device 100 includes two first point-form light sources 130 and two second point-form light sources 140. The first and the second point-form light sources 130 and 140 are respectively disposed at two ends of the first and the second light guiding pillars 110 and 120.

Referring to FIG. 2B, a top view of the lighting device 1001 according to another embodiment is shown. The lighting device 1001 may only include a first point-form light source 130 and a second point-form light source 140. In other embodiments, the lighting device may include more than two first and second point-form light sources 130 and 140. The more than two first and second point-form light sources 130 and 140 can be all disposed at one end of the first and the second light guiding pillars 110 and 120 or respectively disposed at two ends of the first and the second light guiding pillars 110 and 120.

Figure 3:
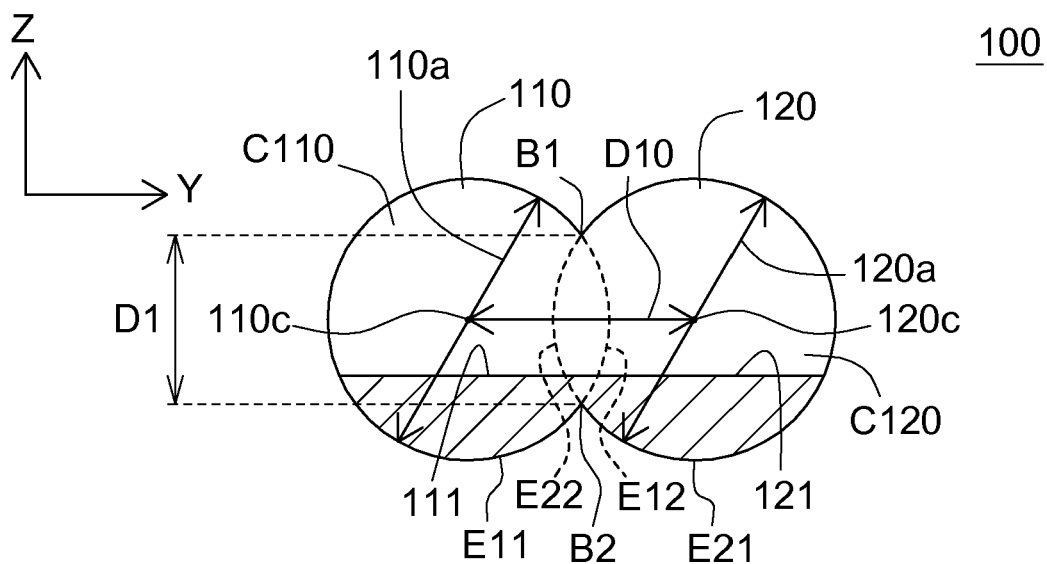
FIG. 3 shows a cross-sectional view along a cross-sectional line 3-3' of the lighting device of FIG. 2.

Referring to FIGS. 2A and 3. FIG. 3 shows a cross-sectional view along a cross-sectional line 3-3' of the lighting device 100 of FIG. 2. As indicated in FIG. 3 of the present embodiment of the invention, the first and the second light guiding pillars 110 and 120 both are a circular-arched pillar. A cross-section of the first light guiding pillar 110 has a first circular-arched peripheral E11, and a first dummy arched peripheral E12 is formed by extending from the first circular-arched peripheral E11. A first dummy circular cross-section C110 is shaped by the first circular-arched peripheral E11 and the first dummy arched peripheral E12. The first dummy circular cross-section C110 has a first diameter 110a. A cross-section of the second light guiding pillar 120 has a second circular-arched peripheral E21, and a second dummy circular peripheral E22 is formed by extending from the second circular-arched peripheral E21. A second dummy circular cross-section C120 is shaped by the second circular-arched peripheral E21 and the second dummy arched peripheral E22. The second dummy circular cross-section C120 has a second diameter 120a. The length of the first diameter 110a is substantially equal to that of the second diameter 120a. That is, since the first and the second light guiding pillars 110 and 120 have similar shapes, the deflection of the light in the first light guiding pillar 110 and that in the second light guiding pillar 120 are also similar. Thus, the lights can be more uniformly emitted from the first and the second light guiding pillars 110 and 120.

As indicated in FIG. 3, the first and the second light guiding pillars 110 and 120 are integrally formed in one piece, there is no gap between the first and the second light guiding pillars 110 and 120, and the dotted lines denote the first and the second dummy arched peripherals E12 and E22 which are formed by extending from the first and second circular-arched peripherals E11 and E21. The first dummy circular cross-section C110 has a first centric point 110c, and the second dummy circular cross-section C120 has a second centric point 120c. The distance D10 between the first centric point 110c and the second centric point 120c is substantially equal to 0.7 through 0.9 times of the length of the first diameter 110a (or the second diameter 120a). Preferably, the distance D10 between the first centric point 110c and the second centric point 120c is substantially equal to 0.8 times of the length of the first diameter 110a (or the second diameter 120a), so that a portion of the light deflected in the first light guiding pillar 110 enters the second light guiding pillar 120, and a portion of the light deflected in the second light guiding pillar 120 also enters the first light guiding pillar 110. Consequently, the lights emitted from the first and the second light guiding pillars 110 and 120 become more uniform.

Referring to FIG. 3, the surface of the first reflective layer 111 and the surface of the second reflective layer 112 are substantially disposed on the same plane and are interconnected, so that there is no fall between the first and the second reflective layers 111 and 121, and the reflection of the light will not be blocked.

In another embodiment, the first and the second reflective layers 111 and 121 can be disposed on the surfaces of the first and the second light guiding pillars 110 and 120. For example, the first and the second reflective layers 111 and 121 can be disposed by way of adhering or coating so as to simplify the manufacturing process of the first and the second reflective layers 111 and 121 and save the mold cost.

Figure 4:
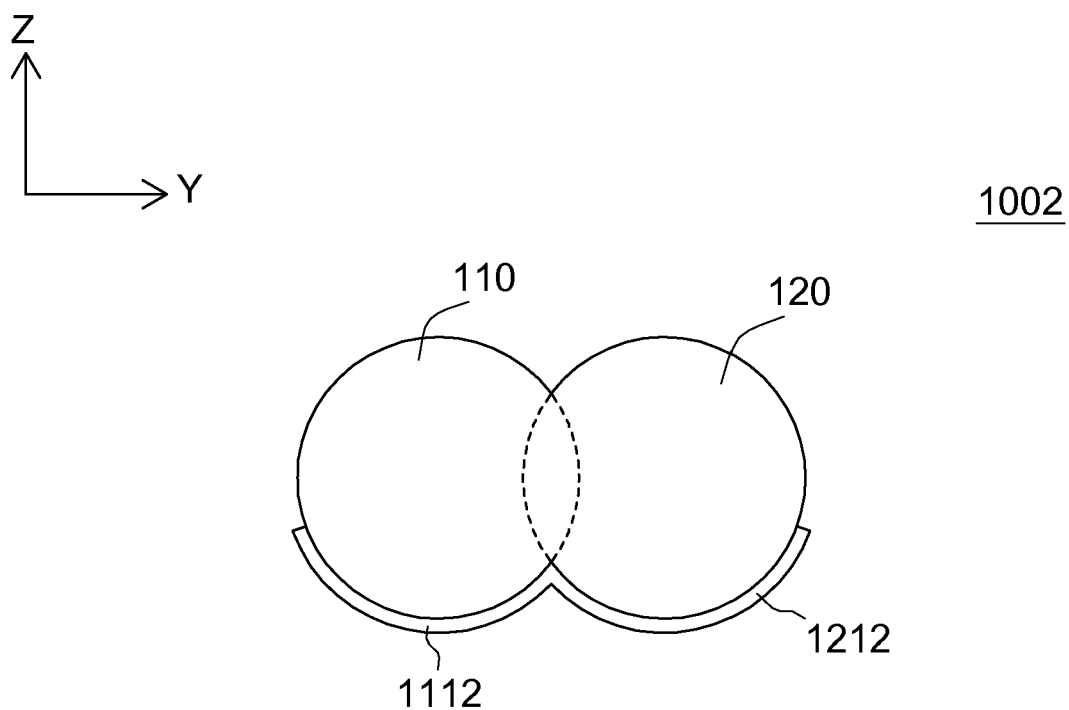
FIG. 4 shows a cross-sectional view of the lighting device according to another embodiment.

Referring to FIG. 4, a cross-sectional view of the lighting device 1002 according to another embodiment is shown. When the first reflective layer 1112 and the second reflective layer 1212 are formed by way of adhering or coating, the first and the second reflective layers 1212 and 1212 are realized by a thin film structure.

Also, the first and the second reflective layers 111 and 121 can be formed by way of squeezing. When the first and the second reflective layers 111 and 121 are formed by way of squeezing, the first and the second reflective layers 111 and 121 are respectively covered by the first and the second light guiding pillars 110 and 120 and are thus protected from external damages.

Second Embodiment

Figure 5:
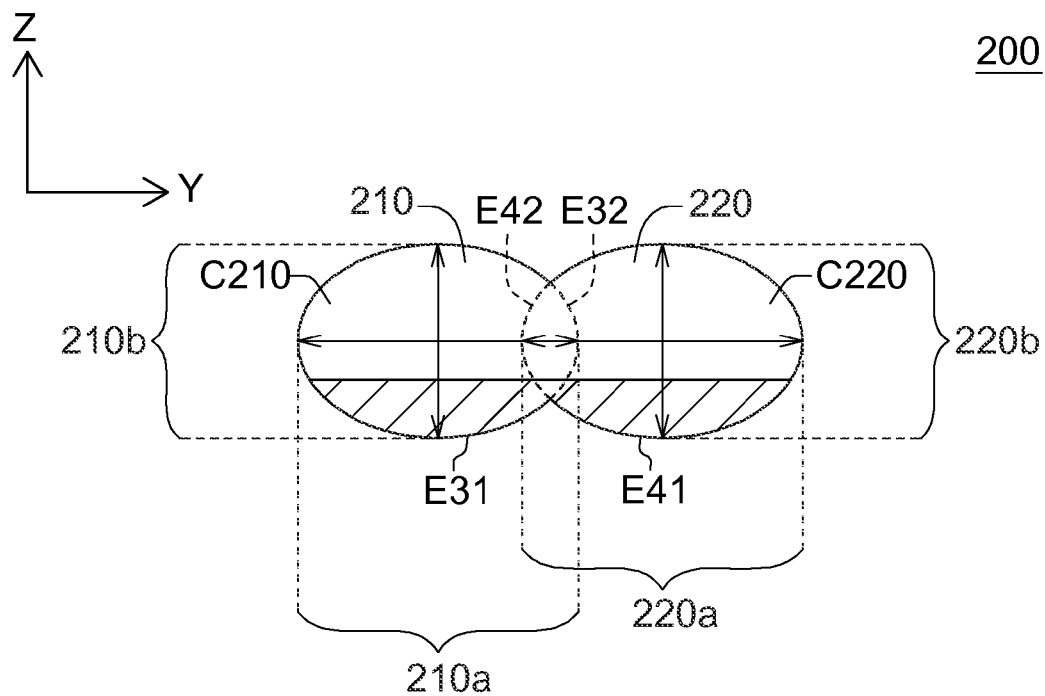
FIG. 5 shows a cross-sectional view of a lighting device according to a second embodiment.

Referring to FIG. 5, a cross-sectional view of a lighting device 200 according to a second embodiment is shown. The lighting device 200 of the second embodiment is different the lighting device 100 of the first embodiment in the shapes of the cross-sections of the first and the second light guiding pillars 210 and 220, and the similarities are not repeated here.

As indicated in FIG. 5, the cross-section of the first light guiding pillar 210 has a first elliptical-arched peripheral E31, and a first dummy elliptical-arched peripheral E32 is formed by extending from the first elliptical-arched peripheral E31. A first dummy elliptical cross-section C210 is shaped by the first elliptical-arched peripheral E31 and the first dummy elliptical-arched peripheral E32. The first dummy elliptical cross-section C210 has a first long axis 210a and a first short axis 210b. The cross-section of the second light guiding pillar 210 has a second elliptical-arched peripheral E41, and a second dummy elliptical-arched peripheral E42 is formed by extending from the second elliptical-arched peripheral E41. A second dummy elliptical cross-section C220 is shaped by the second elliptical-arched peripheral E41 and the second dummy elliptical-arched peripheral E42. The second dummy elliptical cross-section C220 has a first long axis 220a and a first short axis 220b, wherein the length of the first long axis 210a is substantial equal to that of the second long axis 220a, and the length of the first short axis 210b is substantial equal to that of the second short axis 220b. That is, since the first and the second light guiding pillars 210 and 220 have similar shapes, the deflection of the light in the first light guiding pillar 210 and that in the second light guiding pillar 220 are also similar. Thus, the lights can be more uniformly emitted from the first and the second light guiding pillars 210 and 220.

Referring to FIG. 5, the first long axis 210a and the second long axis 220a are substantially interconnected and parallel with each other, so that the first and the second light guiding pillars 210 and 220 are flatter, and the lighting device 200 has wider light outgoing surface.

Third Embodiment

Figure 6:
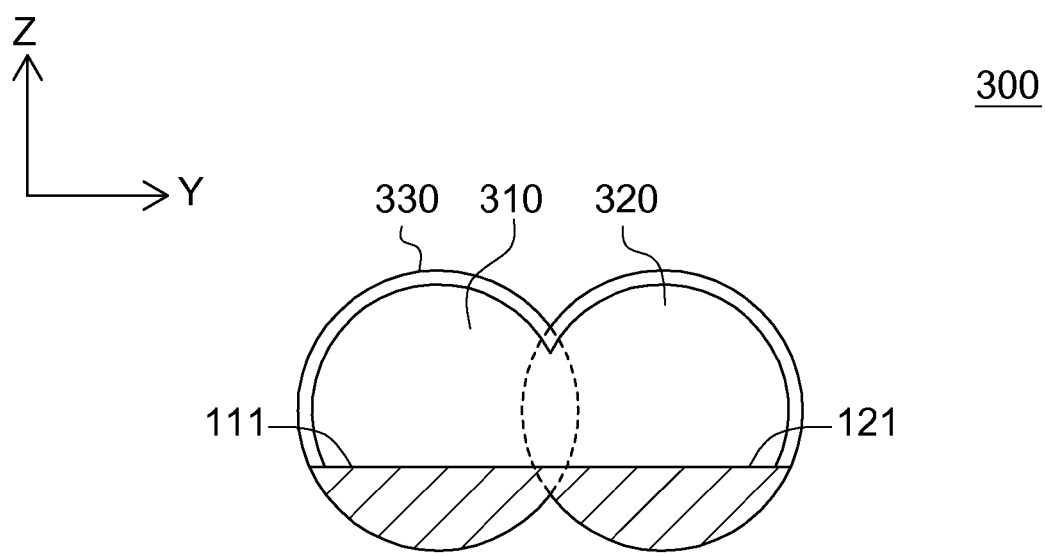
FIG. 6 shows a cross-sectional view of a lighting device according to a third embodiment.

Referring to FIG. 6, a cross-sectional view of a lighting device 300 according to a third embodiment is shown. The lighting device 300 of the third embodiment is different from the lighting device 100 of the first embodiment in that the lighting device 300 further includes a rough layer 330, and the similarities are not repeated here.

As indicated in FIG. 6, the rough layer 330 covers at least a portion of the arched surfaces of the first and the second light guiding pillars 310 and 320 and preferably covers the light outgoing surface of the first and the second light guiding pillars 310 and 320. In the present embodiment of the invention, the arched surface covered by the rough layer 330 is a light outgoing surface opposite to the first and the second reflective layers 111 and 121. If scratch occurs during delivery or assembly, the rough layer 330 mitigates the optical effect caused by scratch. The rough layer 330 can be formed by sandblasting the light outgoing surfaces of the first and the second light guiding pillars 310 and 320, and is capable of mitigating the deterioration in calibration which arises due to the scratch on the light outgoing surfaces of the first and the second light guiding pillars 310 and 320. In another embodiment, the light outgoing surfaces of the first and the second light guiding pillars 310 and 320 can be coarsened. Furthermore, the three structures, namely, the rough layer 330, the first and the second light guiding pillars 310 and 320, and the first and the second reflective layers 111 and 121, can be made from different materials and formed by way of squeezing so that the rough layer 330 does not need to be processed again.

In another embodiment, the rough layer 330 can completely cover the whole arched surface, and any arched surfaces covered by the rough layer 330 would produce the same effect as disclosed above.

In another embodiment, the rough layer 330 of the third embodiment can also be used in the light guide 200 of the second embodiment, and would also produce the same effect.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lighting device, comprising:
   a first light guiding pillar;
   at least one first point-form light source disposed near at least one end of the first light guiding pillar;
   a second light guiding pillar, wherein the second light guiding pillar and the first light guiding pillar are parallel with each other and integrally formed in one piece; and
   at least one second point-form light source disposed near at least one end of the second light guiding pillar;
   wherein, the first and the second light guiding pillars are integrated into a connection body having two opposite surfaces respectively forming two straight grooves on an intersection of the first and the second light guiding pillars, and two bottoms of the straight grooves are spaced by a predetermined distance.

2. The lighting device according to claim 1, wherein the first and the second light guiding pillars both are a circular-arched pillar.

3. The lighting device according to claim 2, wherein a cross-section of the first light guiding pillar has a first circular-arched peripheral, a first dummy arched peripheral is formed by extending from the first circular-arched peripheral, a first dummy circular cross-section is shaped by the first circular-arched peripheral and the first dummy arched peripheral, the first dummy circular cross-section has a first diameter, another cross-section of the second light guiding pillar has a second circular-arched peripheral, a second dummy circular peripheral is formed by extending from the second circular-arched peripheral, a second dummy circular cross-section is shaped by the second circular-arched peripheral and the second dummy arched peripheral, the second dummy circular cross-section has a second diameter, and the length of the first diameter is substantially equal to that of the second diameter.

4. The lighting device according to claim 3, wherein the first dummy circular cross-section further has a first centric point, the second dummy circular cross-section further has a second centric point, the distance between the first centric point, and the second centric point is substantially equal to 0.7 through 0.9 times of the length of the first diameter.

5. The lighting device according to claim 1, wherein a cross-section of the first light guiding pillar has a first elliptical-arched peripheral, a first dummy elliptical-arched peripheral is formed by extending from the first elliptical-arched peripheral, a first dummy elliptical cross-section is shaped by the first elliptical-arched peripheral and the first dummy elliptical-arched peripheral, the first dummy elliptical cross-section has a first long axis and a first short axis, another cross-section of the second light guiding pillar has a second elliptical-arched peripheral, a second dummy elliptical-arched peripheral is formed by extending from the second elliptical-arched peripheral, a second dummy elliptical cross-section is shaped by the second elliptical-arched peripheral and the second dummy elliptical-arched peripheral, the second dummy elliptical cross-section has a first long axis and a first short axis, the length of the first long axis is substantial equal to that of the second long axis, and the length of the first short axis is substantial equal to that of the second short axis.

6. The lighting device according to claim 5, wherein the first long axis and the second long axis are substantially interconnected and parallel with each other.

7. The lighting device according to claim 1, wherein the first light guiding pillar comprises a first reflective layer, the second light guiding pillar comprises a second reflective layer, and the surface of the first reflective layer and the surface of the second reflective layer are substantially disposed on the same plane.

8. The lighting device according to claim 1, wherein a portion of the surface of the first light guiding pillar is coated with a first reflective layer, and a portion of the surface of the second light guiding pillar is coated with a second reflective layer.

9. The lighting device according to claim 1, further comprising:
   a rough layer covering at least a portion of the first and the second light guiding pillars.

* * * * *